March 6, 1951 W. C. LEVERING 2,544,034
ILLUMINATED TOY UNIT
Filed Feb. 26, 1948
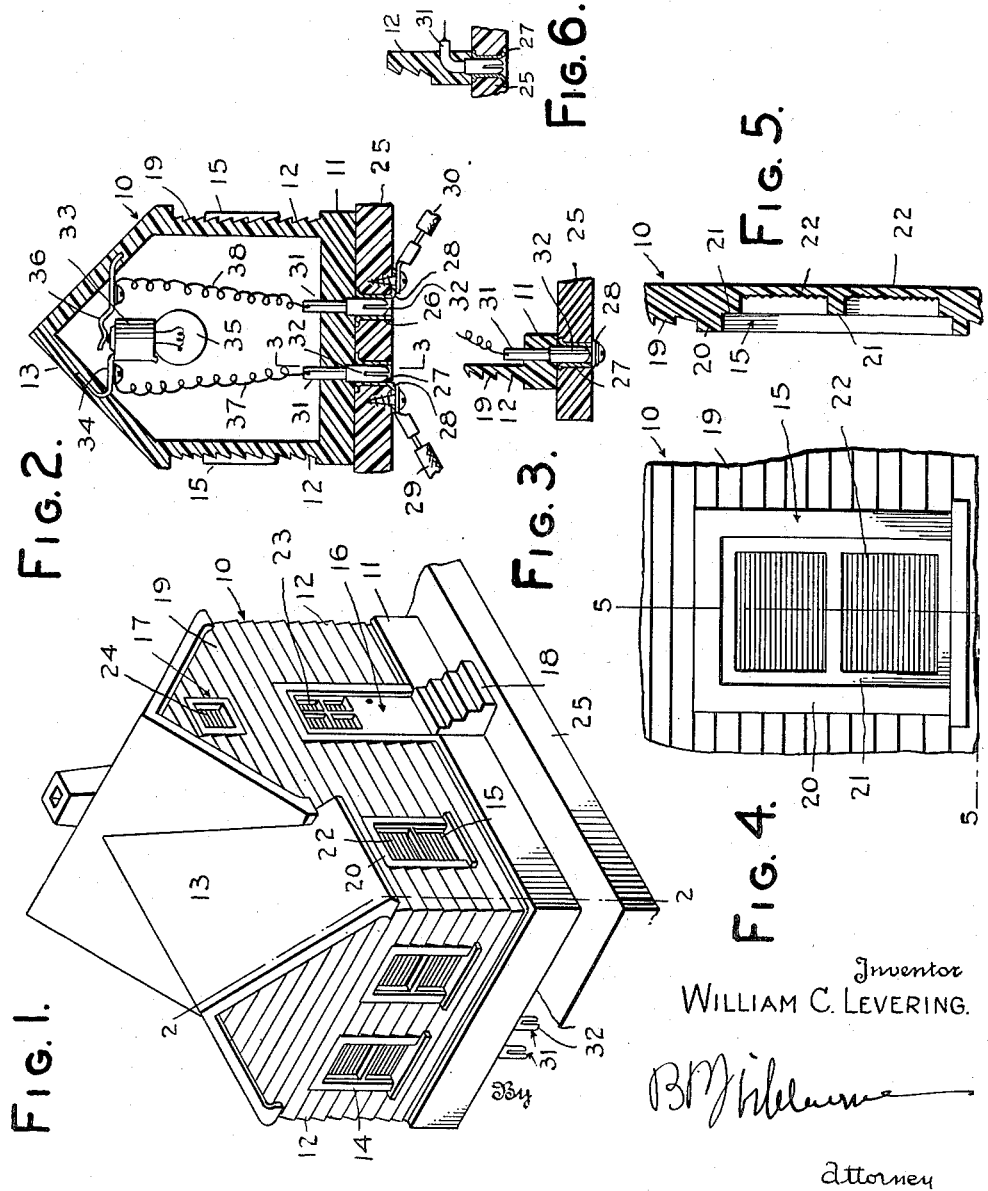
Inventor
WILLIAM C. LEVERING.
Attorney Patented Mar. 6, 1951

2,544,034

UNITED STATES PATENT OFFICE 2,544,034

ILLUMINATED TOY UNIT

William C. Levering, Martinsville, N. J.

Application February 26, 1948, Serial No. 11,049

4 Claims. (Cl. 46—12)

My invention relates to illuminated toy units.

An important object of the invention is to provide a unit of the above mentioned character, which may be molded from plastics material, will be extremely realistic in appearance and will produce an attractive illuminated effect.

A further object of the invention is to provide a unit of the above mentioned character, which is extremely simple, inexpensive to manufacture, and will readily lend itself to be made in miniature sizes.

Other objects and advantages of the invention will be apparent during the course of the following description.

In accompanying drawings, forming a part of this application, and in which like numerals are employed to designate like parts throughout the same, Figure 1 is a perspective view of a miniature toy building embodying my invention, Figure 2 is a vertical section taken on line 2—2 of Figure 1 inwardly of the adjacent parallel wall, Figure 3 is a vertical section taken on line 3—3 of Figure 2.

Figure 4 is an enlarged side elevation of one window, parts of the building broken away, Figure 5 is a vertical section taken on line 5—5 of Figure 4, and, Figure 6 is a vertical section through a modified form of foundation, associated elements in elevation.

As shown in Figures 1 to 5 inclusive, the numeral 10 designates a miniature integral building including a foundation 11, sides 12, and a roof 13. The building is formed of a thermosetting plastics material and I may use a phenolic plastics material such as "Bakelite." I also may use urea plastics material, such as "Beetle" or "Bakelite urea." I contemplate using any suitable thermosetting plastics material which is translucent and may be suitably colored when desired. The several parts of the building are molded as an integral unit and the plastics material is translucent and preferably colored.

One side 12 has windows 14 molded therein, and the other side 12 a window 15 molded therein. The said other side 12 has a door 16 and an attic window 17 molded therein. Steps 18 are molded integral with the foundation 11 and lead to the door 16.

In the illustration given, the sides 12 are molded to represent weather boards 19. Each window 14 and 15 comprises an outer stationary frame 20, within which are arranged sash frames 21, having panes 22. These panes 22 are much thinner than the sides 12 and sash frames 21 and may have about one-fourth the thickness of the side or less. The side of the building is formed of thermosetting plastics material, as stated, and this plastics material is translucent and preferably colored. The thick portions of the building, such as the sides, roof and the like, are translucent only to a slight extent, and very little light will pass through the same. The panes 22 which are much thinner, have a much greater degree of translucency and the light will pass through the same. When the interior of the building is illuminated, it will present the appearance of light shining through the windows of an ordinary house. The panes 22 may have their outer faces smooth, frosted, or serrated. The same is shown serrated. The serrations diffuse the light and prevent the pane from being transparent, or substantially transparent, when made thin enough for that purpose. The invention is in no sense restricted to the frosting or serrations.

The door 16 is translucent only to a slight degree and has highly translucent panes 23, corresponding to the panes 22. The attic window 17 has a highly translucent pane 24, corresponding to the pane 22. All parts of the building are integral and molded of the same material.

The numeral 25 designates a horizontal landscaped base, also formed of molded thermosetting plastics material, which may be treated to simulate a lawn. This base has metallic sockets 26 and 27, which may be molded therein. These sockets have terminals 28, for connection with wires 29 and 30.

The foundation 11, at one side of the building, has metallic plugs 31 embedded therein, extending above and below the same and arranged inwardly of and near the adjacent side 12. These plugs have lower resilient ends 32, for insertion within the socket 27. The plugs and sockets are spaced, and when the plugs are inserted within the sockets 27, they serve to locate the building with respect to the foundation 25 and detachably secure the building to such foundation, against accidental displacement.

Arranged within the building adjacent to the roof is a socket 33, carried by a terminal 34 which is rigidly secured to the roof by any suitable means, as by being embedded therein. This socket engages the outer terminal of an electric bulb 35, the inner terminal of which engages a contact or terminal 36, rigidly secured to the roof by any suitable means, as by being embedded therein. A wire 37 is connected with one plug 31 and with the terminal 34 and a wire 38 is connected with the other plug 31 and the contact or terminal 36. When the building is located upon the foundation, by inserting the plugs 31 within the sockets 27, it is obvious that a circuit may be closed for causing the bulb 35 to glow.

In Figure 6 the foundation 11 has its inner face flush with the inner face of the side 12. The plug 31 is embedded in the foundation 11, but its upper end is bent inwardly horizontally to project inwardly beyond the inner face of the side 12. The wires are secured to the horizontal ends of the plugs 31. This arrangement of the foundation 11 has some advantages from a molding standpoint. All other parts of the invention remain identical with those shown and described in connection with the first form of the invention.

It is to be understood that the forms of my invention herewith shown and described are to be taken as preferred examples of the same and that various changes in the shape, size and arrangement of parts may be resorted to without departing from the spirit of my invention or the scope of the subjoined claims.

Having thus described my invention, what I claim is:

1. A toy unit in the form of a building formed of molded thermosetting plastics material which is translucent, the building including a wall, the wall having a window molded therein, said window including a pane integral with the wall and much thinner than the wall and much more translucent than the wall, a base for supporting the building, a plurality of electrical sockets secured to the base, a plurality of plugs secured to the lower portion of the building for insertion within the sockets and serving to locate the building upon the base and to detachably secure the building to the base against accidental displacement, an electric bulb mounted within the building, and means electrically connecting the plugs with the terminals of the bulb.

2. A toy unit in the form of a building formed of molded thermosetting plastics material which is translucent, the building including a body portion and foundation, the wall of the body portion having a window molded therein, said window including a pane integral with the body portion wall and much thinner than the wall and much more translucent than said wall, substantially vertical plugs embedded in the foundation and projecting below the same and having their upper ends bent laterally to extend upon the inner side of the adjacent body portion wall, a landscape base formed of molded thermosetting plastics material and having electric sockets embedded therein and substantially vertically arranged, the lower ends of the plugs being adapted for insertion within the sockets and thereby locating the building upon the landscape base and detachably securing the building to the base against accidental displacement, means to mount an electric bulb within the building, and means to connect the terminals of the bulb with the plugs.

3. A toy, comprising a unitary house formed of molded translucent material, the house including side walls, a foundation, and a top, at least one side wall having a window molded therein, said window including a pane integral with the side wall and much thinner than the side wall and much more translucent, the foundation forming a large opening at the bottom of the house, a base upon which the foundation is mounted, a plurality of spaced electrical sockets embedded within the base, a plurality of plugs secured to the foundation and projecting downwardly below the foundation for insertion within the sockets and serving to locate the foundation upon the base and to detachably secure the foundation to the base, a bulb receiving electrical fixture mounted within the housing, and wires connecting the plugs and electrical fixture.

4. A toy, comprising a unitary house formed of molded translucent material, the house including side walls, a foundation, and a top, the foundation extending inwardly beyond the side walls and forming a large opening at the bottom of the house, certain of the side walls having windows molded therein, each window including a pane integral with the side wall and much thinner than the side wall and much more translucent, a base upon which the foundation is mounted, a plurality of substantially vertical spaced electrical sockets embedded within the base and having their upper ends terminating substantially at the elevation of the upper face of the base, a plurality of spaced substantially vertical plugs embedded in the foundation upon the inner side of the adjacent side wall and projecting downwardly below the foundation for insertion within the sockets and serving to locate the foundation upon the base and to detachably secure the foundation to the base, a bulb receiving electrical fixture mounted within the housing, and wires connecting the plugs and electrical fixture.

WILLIAM C. LEVERING.

REFERENCES CITED

The following references are of record in the file of this patent:

UNITED STATES PATENTS

| Number | Name | Date |
| --- | --- | --- |
| 1,889,468 | Flannery | Nov. 29, 1932 |
| 2,153,983 | Kelch et al. | Apr. 11, 1939 |
| 2,217,877 | Petry | Oct. 15, 1940 |
| 2,248,117 | Petry | July 8, 1941 |
| 2,310,037 | Reno | Feb. 2, 1943 |